W. H. MITCHELL.
HOE DRILL.
APPLICATION FILED JUNE 30, 1920.
1,415,674.
Patented May 9, 1922.
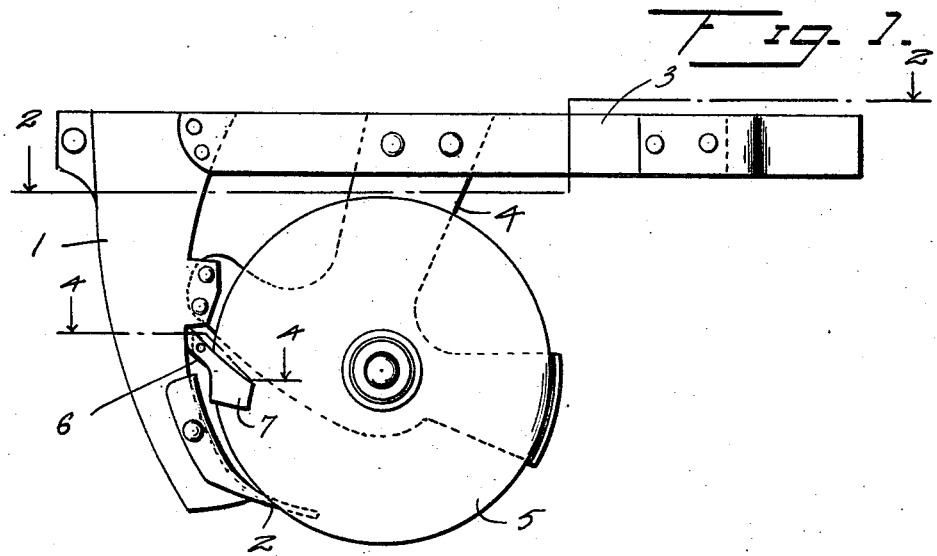
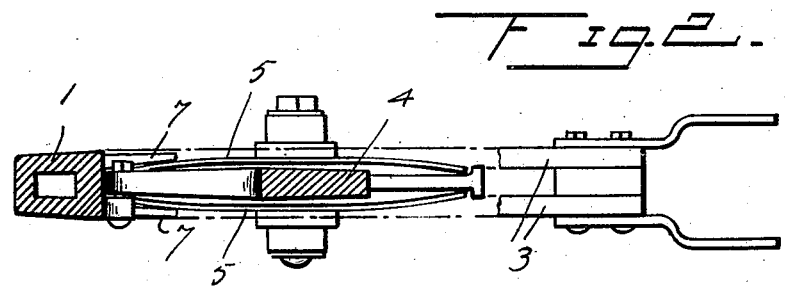
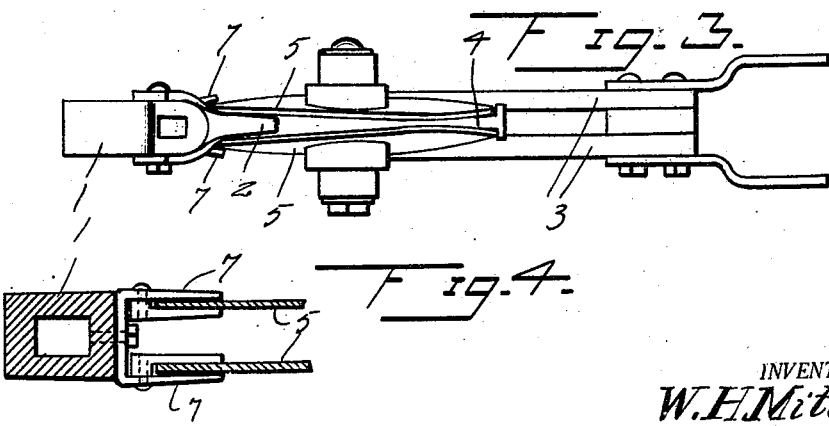
INVENTOR.
W. H. Mitchell
BY
ATTORNEY.

UNITED STATES PATENT OFFICE.

WILLIAM H. MITCHELL, OF SULPHUR WELL, KENTUCKY.

HOE DRILL.

1,415,674.  Specification of Letters Patent.  Patented May 9, 1922.

Application filed June 30, 1920. Serial No. 393,141.

*To all whom it may concern:*

Be it known that I, WILLIAM H. MITCHELL, a citizen of the United States, residing at Sulphur Well, in the county of Metcalfe and State of Kentucky, have invented certain new and useful Improvements in Hoe Drills; and I do hereby declare the following to be a full, clear, and exact description of the invention, such as will enable others skilled in the art to which it appertains to make and use the same.

This invention relates to hoe drills adapted to be used for planting seed in the soil and it consists in the novel features hereinafter described and claimed.

An object of the invention is to provide in combination with a hoe drill means of simple and durable structure applied to the drill and adapted to keep the same free from the accumulation of trash or other material in order that the seed may be properly deposited in the furrow which is opened by the hoe and will remain in proper alignment in the drill line.

With this object in view the hoe drill comprises a drill member having a soil penetrating point adapted to open a furrow in the soil. A reach or beam is connected at its rear end with the upper portion of the drill member and a standard is carried by the said beam and drill member and located in advance of the drill member and under the beam. Flat disks are journaled upon the standard 1 at each side thereof and the said disks converge toward each other in a forward direction and their forward edges are in close proximity to each other, the rear portions of the disks receive the point of the drill member between them. Scrapers are supported from the rear portion of the standard and lie against the outer surfaces of the disks. The arrangement is such that the disks prevent trash from accumulating upon the drill member, the hoe point of the drill member prevents soil from adhering to the inner surfaces of the disks and the scrapers remove the soil which may adhere to the outer surfaces of the disks when the device is in use.

In the accompanying drawing:—

Figure 1 is a side elevation of the hoe drill.

Figure 2 is a sectional view of the same on line 2—2 of Figure 1.

Figure 3 is a vertical transverse sectional view of the same.

Figure 4 is a horizontal sectional view of the same taken on line 4—4 of Figure 1.

The hoe drill comprises a hoe 1 of usual pattern and provided at its lower forward portion with a hoe point 2 adapted to penetrate the soil and open a furrow in the same as the hoe moves over a field. Beams 3 are connected at their rear ends with the upper portion of the point 2 and may be connected at their forward ends with a seeding machine of any usual pattern. A standard 4 is connected with the intermediate portions of the beams 3 and connected with the forward intermediate portion of the hoe 1. The standard 4 lies below the beams and in front of the hoe. Flat disks 5 are journaled at the opposite sides of the standard 4 and the said disks converge toward each other from their rear portion to their forward portion, and their forward edge portions lie in close proximity to each other. The point 2 of the hoe 1 is received between the lower rear portions of the disks 5. Arms 6 are attached to the standard 4 at the point where the said standard is connected with the hoe 1. Scraper blades 7 extend from the hoe 1 and lie against the exterior surfaces of the disks 5.

As the implement advances, disks 5 enter the soil and depressing and oftentimes cutting and breaking the trash in its path. Such trash is thus prevented from accumulating at shoe 1, and particularly at point 2. The said point 2 can thus freely open the furrow to receive seed discharged through hoe 1. Blades 7 effectively clean soil from the disks as they rotate incidental to travel.

From the foregoing description taken in conjunction with the accompanying drawing it will be seen that a hoe drill of simple and durable structure is provided and that the parts thereof are so arranged as to mutually cooperate with each other to prevent the drill from accumulating trash or from being clogged by the accumulation of soil or loose material which may occur at the surface of the ground.

Having described the invention what is claimed is:

The combination, in an implement of the class described, of beams, a hoe secured to and depending from said beams at their rear ends, a plow point on said hoe, a standard secured intermediate said beams and to said hoe, angularly disposed disks journaled to and on opposite sides of said standard and relatively close to the plow point, said plow point extending intermediate said disks to prevent accumulation of trash, a bracket on said hoe intermediate the point and connection of the standard thereto, and scraper blades extending from said bracket and engaging opposite sides of each disk.

In testimony whereof I affix my signature in presence of two witnesses.

WILLIAM H. MITCHELL.

Witnesses:
OAKLEY CLARK,
STANLEY CLARK.